(12) United States Patent
Cunningham et al.

(10) Patent No.: US 6,453,174 B1
(45) Date of Patent: Sep. 17, 2002

(54) ROAMING INTERWORKING GATEWAY FOR MOBILE TELECOMMUNICATIONS SYSTEMS

(75) Inventors: Joseph Cunningham; Augustine Collins; Neillus O'Shea; Aidan Dillon, all of Dublin (IE)

(73) Assignee: Markport Limited, Dublin (IE)

( * ) Notice: Subject to any disclaimer, the term of this patent is extended or adjusted under 35 U.S.C. 154(b) by 0 days.

(21) Appl. No.: 09/155,515

(22) Filed: Sep. 24, 1998

Related U.S. Application Data

(63) Continuation of application No. PCT/IE97/00027, filed on Mar. 27, 1997.

(30) Foreign Application Priority Data

Mar. 28, 1996 (IE) ................................................ S960255

(51) Int. Cl.[7] .......................... H04Q 7/20; H04Q 7/28; H04Q 7/23
(52) U.S. Cl. ...................... 455/560; 455/432; 455/433; 455/435; 455/445; 455/422
(58) Field of Search ................................. 455/560, 432, 455/433, 435, 439, 445, 422, 440, 403, 438, 426, 517, 514, 550, 552, 448

(56) References Cited

U.S. PATENT DOCUMENTS

| | | | | |
|---|---|---|---|---|
| 5,608,779 A | * | 3/1997 | Lev et al. | 455/560 |
| 5,862,481 A | * | 1/1999 | Kulkarni et al. | 455/432 |
| 5,884,169 A | * | 3/1999 | Uchiyama et al. | 455/433 |
| 6,006,094 A | * | 12/1999 | Lee | 455/445 |
| H1895 H | * | 10/2000 | Hoffpauir et al. | 455/433 |

FOREIGN PATENT DOCUMENTS

| | | |
|---|---|---|
| EP | 0379642 | 8/1990 |
| WO | WO94/05129 | 3/1994 |
| WO | WO95/01069 | 1/1995 |
| WO | WO95/27382 | 10/1995 |
| WO | WO96/24226 | 8/1996 |

OTHER PUBLICATIONS

Fourth IEEE Intl Conference . . . , Uchiyama et al, "Network Functions and Signaling . . . ", Nov. 6–10, 1995, pp. 447–451.

* cited by examiner

*Primary Examiner*—William Trost
*Assistant Examiner*—Keith Ferguson
(74) *Attorney, Agent, or Firm*—Jacobson Holman, PLLC

(57) ABSTRACT

A roaming interworking gateway has a modular unit associated with an IS.41 system, a modular unit associated with a FSM system, and a translation function. The translation function accesses a database which stores subscriber data upon registration of a subscriber in a roamed mobile system. Each modular unit comprises an authentication center to perform authentication before registration. The RIG is implemented on a distributed hardware structure having a high-speed network to which are connected network access processors (NAP), database servers, and an operations and maintenance processor. Each modular unit resides on a single network access processor. The translation function has a module residing on the NAP of each associated modular unit.

12 Claims, 9 Drawing Sheets

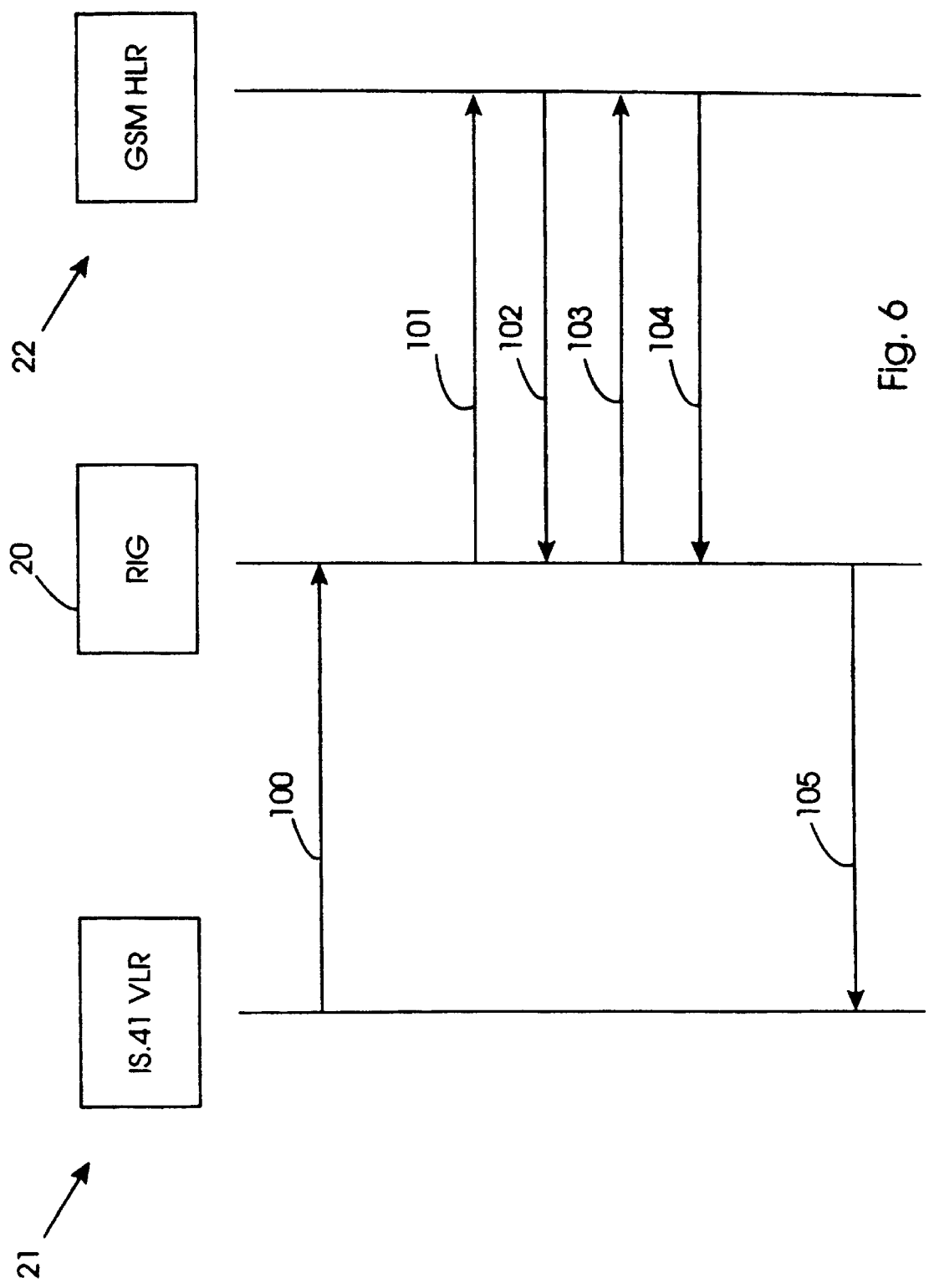

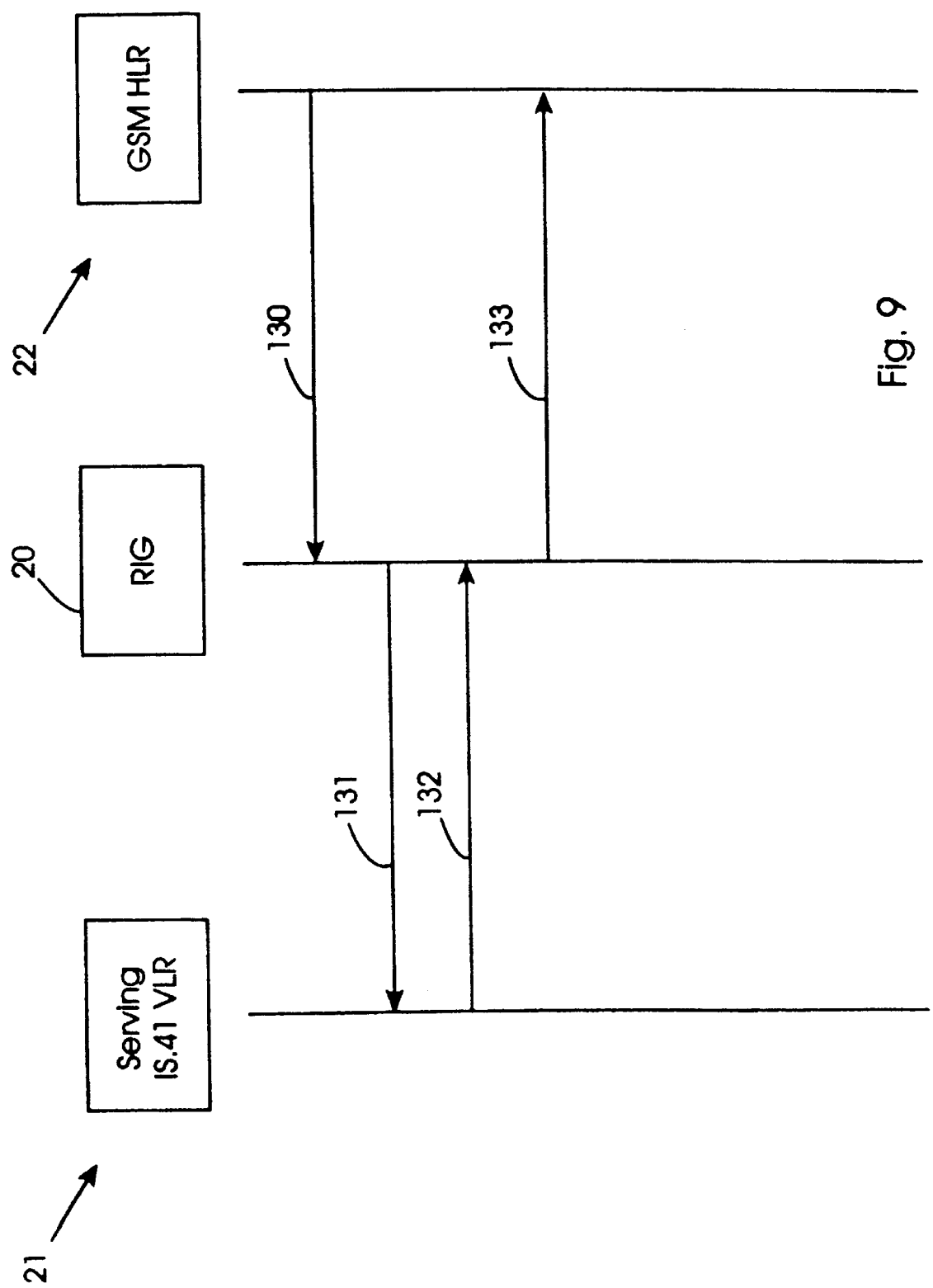

ROAMING INTERWORKING GATEWAY FOR MOBILE TELECOMMUNICATIONS SYSTEMS

This is a continuation application of PCT/IE97/00027 filed Mar. 27, 1997.

BACKGROUND OF THE INVENTION

FIELD OF THE INVENTION

The invention relates to a roaming interworking gateway (RIG) for interworking of two non-compatible mobile telecommunications systems such as those based on the GSM, IS.41, and PDC standards. Such systems are often alternatively referred to as networks.

Several such gateways are known and are described, for example, in WO 95/27382 (L. M. Ericsson), WO 95/01069 (Vodaphone), EP 379642 (GTE), WO 94/05129 (L. M. Ericsson), and WO 96/24226 (Qualcomm). It appears that these specifications are quite effective at allowing interworking of two non-compatible systems for which they are built. However, the demand for production of gateways for a wide variety of different non-compatible systems such as different systems working within the general IS.41 standard in the U.S.A., the European-based GSM, the Japanese PDC, and various other systems such as those in Asia, is difficult to meet because of the long lead times which are involved in development of the systems. This is because they are specifically programmed for the particular pair of non-compatible systems, and they are often integrated with switches in hardware. A related disadvantage is that they are difficult to modify and upgrade and it is also difficult to extend the interworking capabilities as interworking requirements grow.

SUMMARY OF THE INVENTION

It is therefore an object of the invention to provide a RIG which is easily scalable and is easily modified to adapt to changing circumstances. More particularly, it is also an object of the invention to provide a RIG which provides at least some of the following services:

- to allow subscribers of one system to roam transparently in another system and to receive and make calls using their home telephone number,
- to support billing services for different types of roamers,
- to preserve, where possible, supplementary services between the systems where that service can be provided, such as call forwarding, and
- to provide additional services to roamers when visiting a system.

According to the invention, there is provided a roaming interworking gateway for interworking of at least two mobile telecommunication systems having non-compatible standards, the gateway comprising:

- a modular unit associated with a first mobile system and comprising a pseudo network element of the first system;
- a modular unit associated with a second mobile system and comprising a pseudo network element for the second system; and
- an interworking translation function linking the modular units and comprising means for performing data and protocol conversion between the units.

Preferably, each modular unit comprises at least two pseudo network elements at different hierarchal mobile system levels.

In one embodiment, each modular unit comprises a pseudo HLR, and a pseudo MSC or VLR or both an MSC and a VLR.

Ideally, each pseudo HLR comprises means for routing signalling set-up signals for a terminating call to a visited system, the MSC or VLR comprising means for receiving such signals from a home system.

In another embodiment, each modular unit comprises an authentication function comprising means for authenticating roamers in the associated mobile system domain.

Preferably, each modular unit comprises a MAP-Interface which comprises means for accessing a database.

In one embodiment, the translation function comprises a translation module interacting with the MAP-User of each MAP-Interface and comprising means for accessing a database.

In a further embodiment, said database access means comprises means for directing storage of subscriber profile data when a subscriber roams in one of the associated mobile systems to provide profile translation in a transparent manner. Ideally, each modular unit resides on a network access processor.

Preferably, the translation function comprises at least two translation modules residing on one or more network access processors.

In another embodiment, the gateway comprises a high speed network linking hardware machines in a distributed manner.

Preferably, the gateway further comprises an operations and maintenance processor connected to the network.

Ideally, the gateway further comprises a billing conversion function.

In one embodiment, the billing conversion function resides on an operations and maintenance processor of the gateway.

The invention will be more clearly understood from the following description of some embodiments thereof, given by way of example only with reference to the accompanying drawings, in which,

BRIEF DESCRIPTION OF THE DRAWINGS

FIGS. 6 to 9 are signal transfer diagrams for operation of a gateway.

DESCRIPTION OF THE INVENTION

Figure 1:
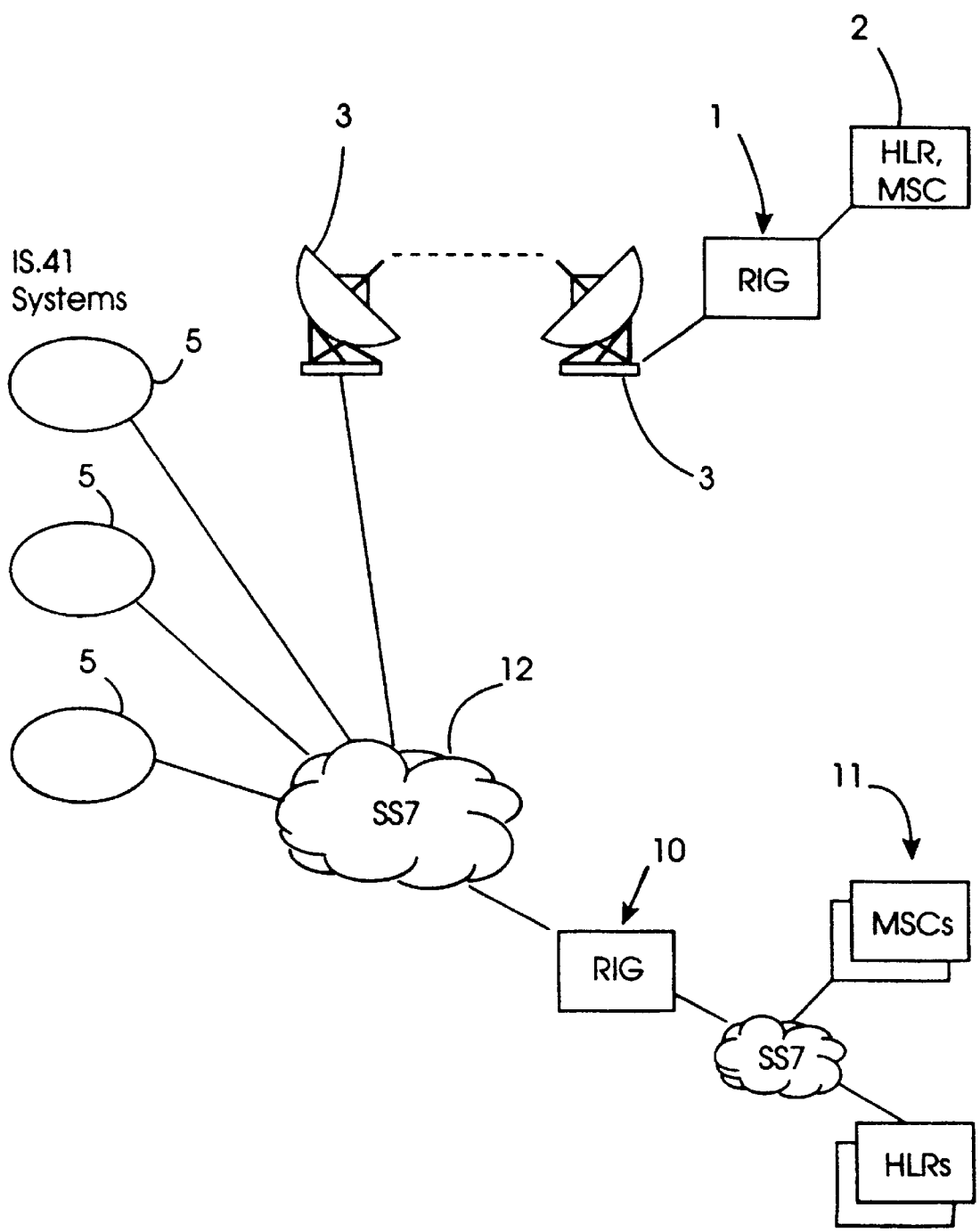
FIG. 1 is a schematic representation showing the context of a gateway of the invention.

Referring to the drawings, and initially to FIG. 1 there are shown two roaming interworking gateways (RIGS) 1 and 10 of the invention. The RIG 1 is connected to a relatively small GSM system 2 having a combined home location register (HLR) and mobile switching centre (MSC). The RIG 1 allows interworking of the system 2 via a ground station (not shown) and a satellite system 3 with various IS.41 systems 5. The RIG 10 allows interworking of a relatively large GSM system 11 with the IS.41 systems 5 via an SS7 signalling system 12.

Figure 2:
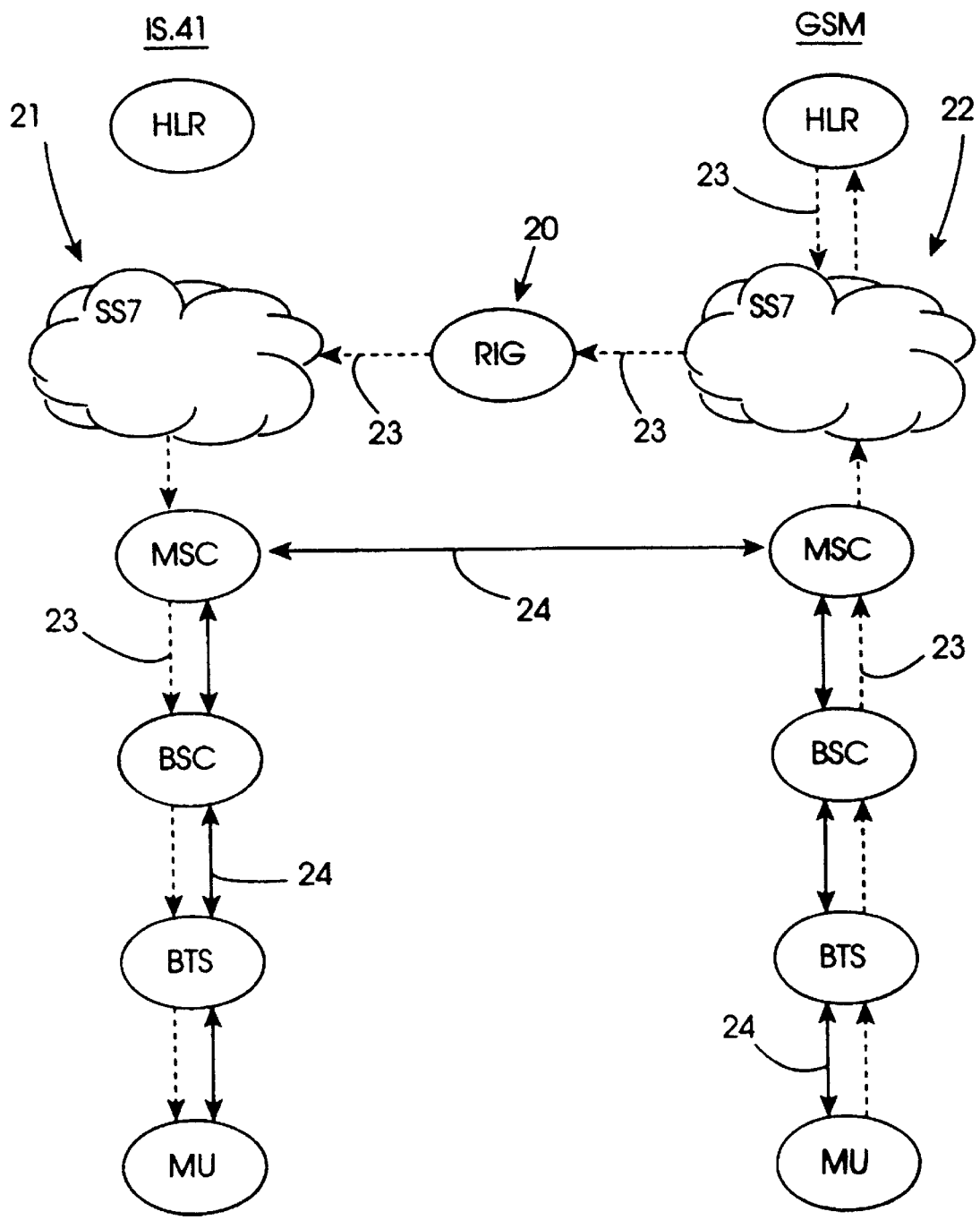
FIG. 2 is a schematic diagram illustrating connections for interworking between a GSM system and an IS.41 system.

Referring now to FIG. 2, examples of interworking signals are shown in a general arrangement. The signals are interworked by a RIG 20 between an IS.41 system 21 and a GSM system 22. The interrupted lines 23 illustrate a setup signal for a terminating call in which a GSM user roaming in the IS.41 system 21 is called. The signal is routed up through the layers of the GSM system 22, namely the mobile unit (MU), the base transceiver station (BTS), the base switching centre (BSC), the mobile switching centre (MSC), the signalling system (SS7) and the HLR. The HLR recognises that the called subscriber is roaming in the IS.41 system 21 and routes the signal to the RIG 20, which in turn routes it to the MSC of the IS.41 system 21 via the SS7. The signal then passes down through the BSC and BTS layers of the IS.41 system 21 until it reaches the called subscriber MU. This establishes the connection, and from then on the actual call takes place between the MSCs of the two systems, as illustrated by the full signal lines 24. If the call originated from a telephone of a fixed PSTN system, then it would be routed directly into the GSM signalling system SS7. Other types of signals such as location update or registration, authentication, or supplementary service signals can also be transmitted. These are described in more detail below.

Figure 3:
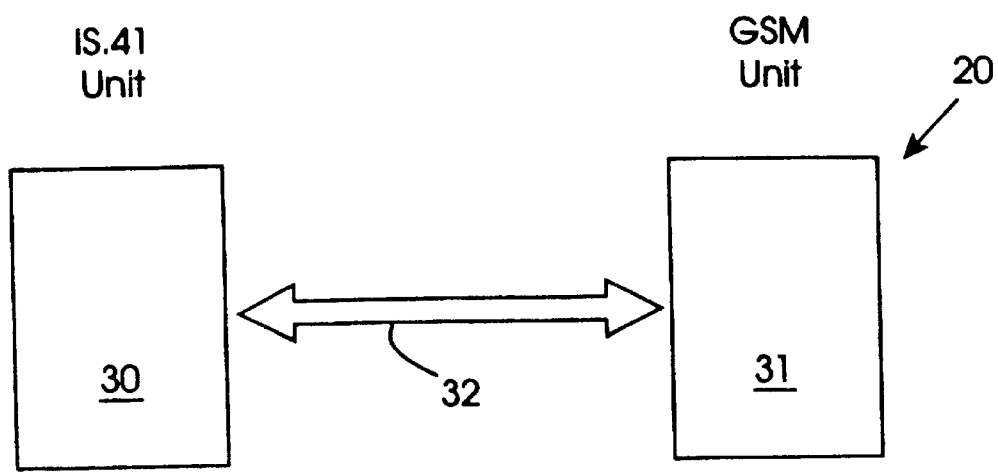
FIG. 3 is a high-level diagram illustrating the modular structure of a gateway of the invention.
Figure 4:
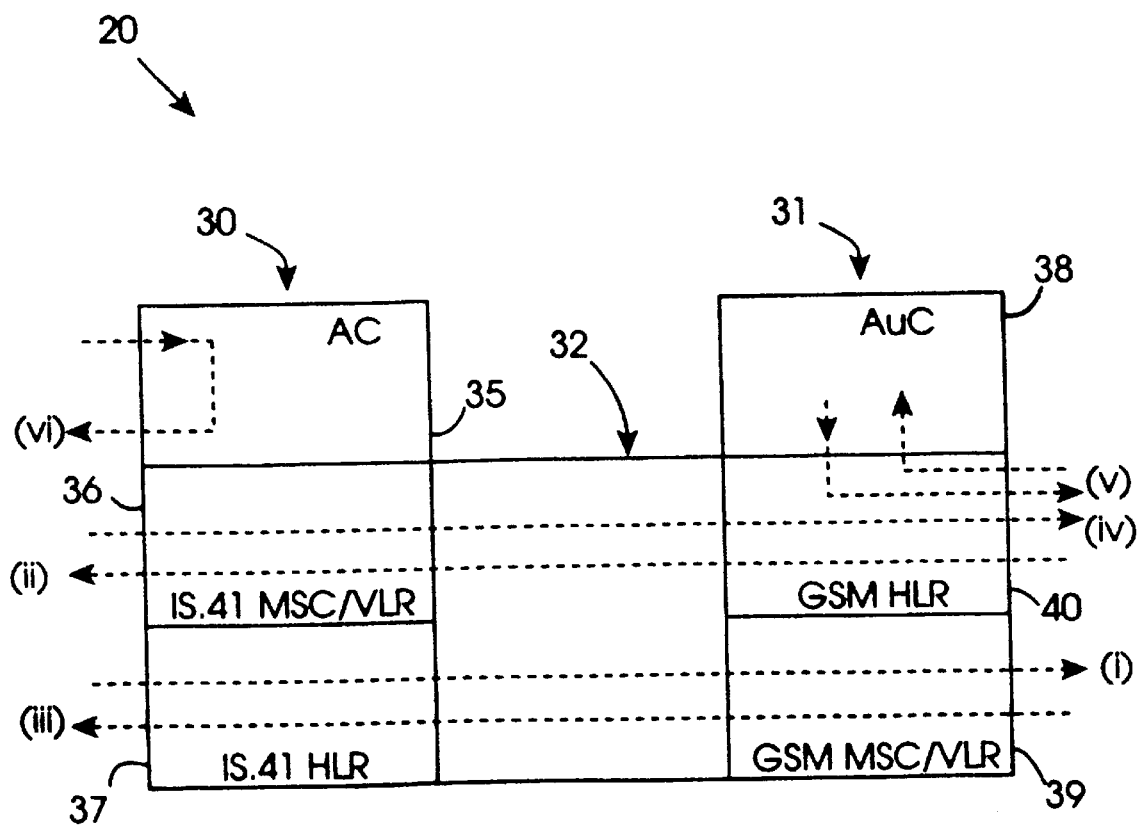
FIG. 4 is a diagram illustrating the major functional components of a gateway and the way in which signals are routed through it.

Referring now to FIGS. 3 and 4, the functional structure of the RIG 20 of the invention is illustrated. A very important aspect of the RIG is that it has the following features:

Network resilience. This ensures that there is no loss of service in the event of failure of a hardware or software component.

Scalable capacity. For example, it is possible to scale a RIG of the invention from a capacity of 1 million subscribers up to 4 million subscribers.

On-line upgrade capability. It is important to have the ability to easily add capacity and features without service disruption.

Numbering flexibility. The RIG ensures total flexibility in allocation of subscriber numbers such as IMSIs and MINs.

Flexibility. The RIG has the ability to define, trial and deploy new features and services in a simple manner.

Features of the RIG which achieve the above include the fact that the functionality is provided in software modules and that the physical implementation is in a distributed network arrangement.

Referring to FIG. 3, modularity at its highest level is illustrated, in which the RIG 20 comprises an IS.41 modular unit 30, a GSM modular unit 31, and a translation function 32. Each of the parts 30, 31 and 32 may be easily upgraded or modified independently of the other parts. Further, the RIG may be expanded to cater for additional interworking by simply adding modular units and translation functions associated with additional telecommunication systems to be interworked.

Referring now to FIG. 4 the structure of each of the modular units is now described in more detail. The modular unit 30 comprises an authentication centre (AC) 35, a pseudo IS.41 MSC/VLR 36 and a pseudo IS.41 HLR 37. The modular unit 31 comprises a GSM HLR 40, a pseudo GSM MSC/VLR 39, and a GSM authentication centre (AuC) 38. These are the basic functional components of the modular units. As is clear from FIG. 2 in conjunction with FIG. 4, when the RIG 20 is connected to two systems such as the systems 21 and 22 shown in FIG. 2 the GSM side will interface with pseudo GSM network elements, namely the HLR 40 and the MSC/VLR 39. Thus, the GSM system 22 "thinks" it is communicating with another GSM system. The same comments apply to the IS.41 side whereby the IS.41 system 21 communicates with the IS.41 modular unit 30. The cross-standard nature of the communication is transparent to the systems 21 and 22 because the pseudo network elements of the RIG 20 interact as if they were real elements of a compatible system. FIG. 4 also shows various signals (i) to (vi) which are described in more detail below.

Figure 5A:
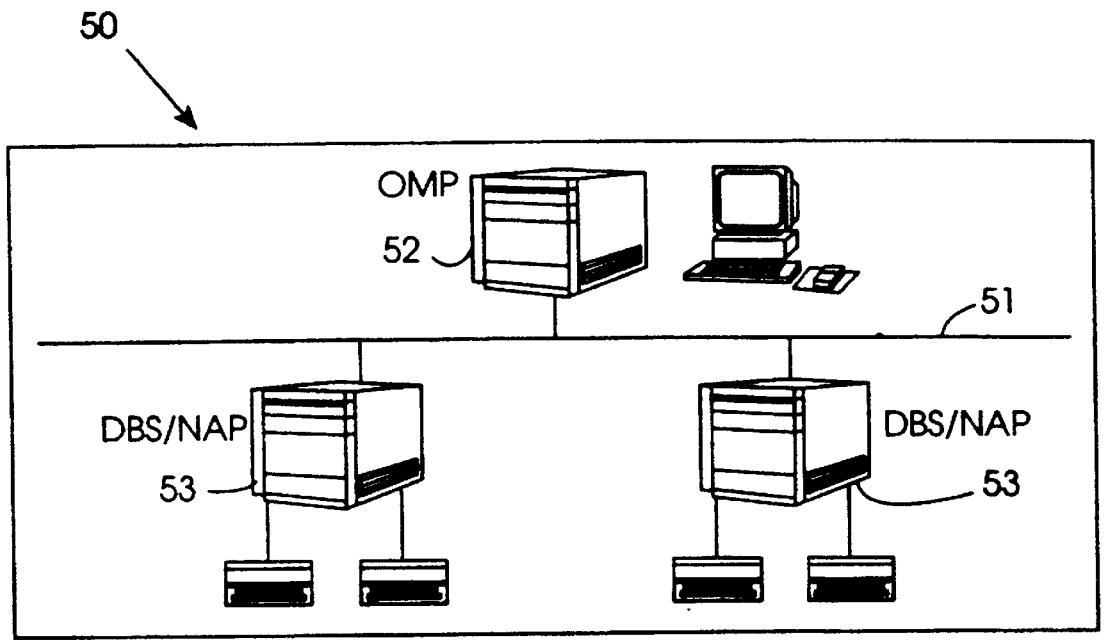
FIGS. 5(a), 5(b) and 5(c) are diagrams illustrating implementations of gateways of the invention in hardware terms.
Figure 5B:
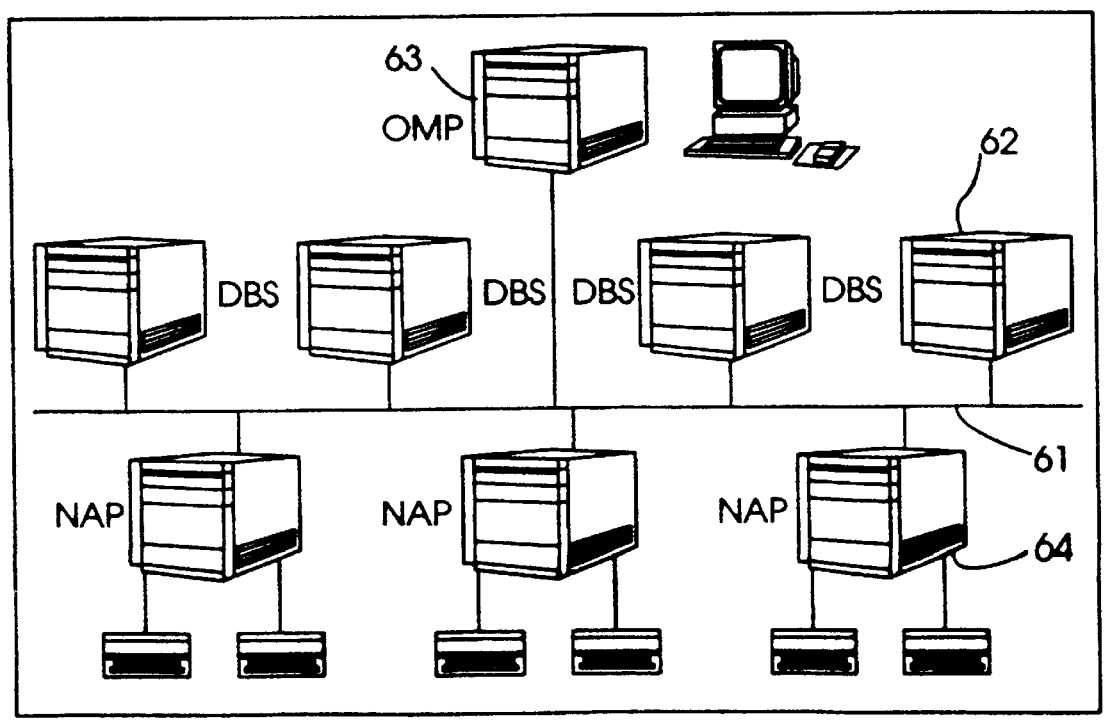

Referring now to FIGS. 5(a) and 5(b) physical implementations of the RIG 20 are illustrated. The architecture is distributed in which there are three types of components configured in a redundant fashion. The three layers of components are:

Network access processors. These provide access to the RIG. Each network access processor (NAP) is a stand-alone component which can be located remotely from all other NAPs and other components of the RIG.

Nodes accessing the RIG have a first choice and second choice route to differing NAPs for high availability. The NAPs are deployed in an "N+1 redundant" configuration thus providing the joint benefits of being able to add capacity through deployment of additional systems and also no loss of service on system failure.

Database Servers. These provide a fully centralised, redundant subscriber database for the RIG. These can be enhanced to act as service data points (SDPs) with other intelligent network components. The database servers are deployed in a "2N redundant" configuration, thus ensuring that all subscriber data is maintained in at least two locations and there is no loss of service on failure of a database server.

Operations and maintenance processor. This provides full administration and management of the RIG, including mediation with the operators subscriber administration and network management systems.

As shown in FIG. 5(a), the RIG 50 has a high speed network 51 to which is connected an OMP machine 52 and a pair of DBS/NAP machines 53. A RIG 60 shown in FIG. 5(b) has a larger capacity and comprises a high speed network 61, four DBS machines 62, one OMP machine 63, and four NAP machines 64.

The link between the functional architecture of FIGS. 3 and 4 and the physical architectures of FIGS. 5(a) and 5(b) is now described with reference to FIG. 5(c). Each NAP 64 comprises the following software modules to form a modular unit:

a MAP-Interface having an SS7 stack 70, a MAP-Provider 71, and a MAP-User 72, database access and other interfaces 73, an authentication module AC 35 or AuC 38, as appropriate.

Figure 5C:
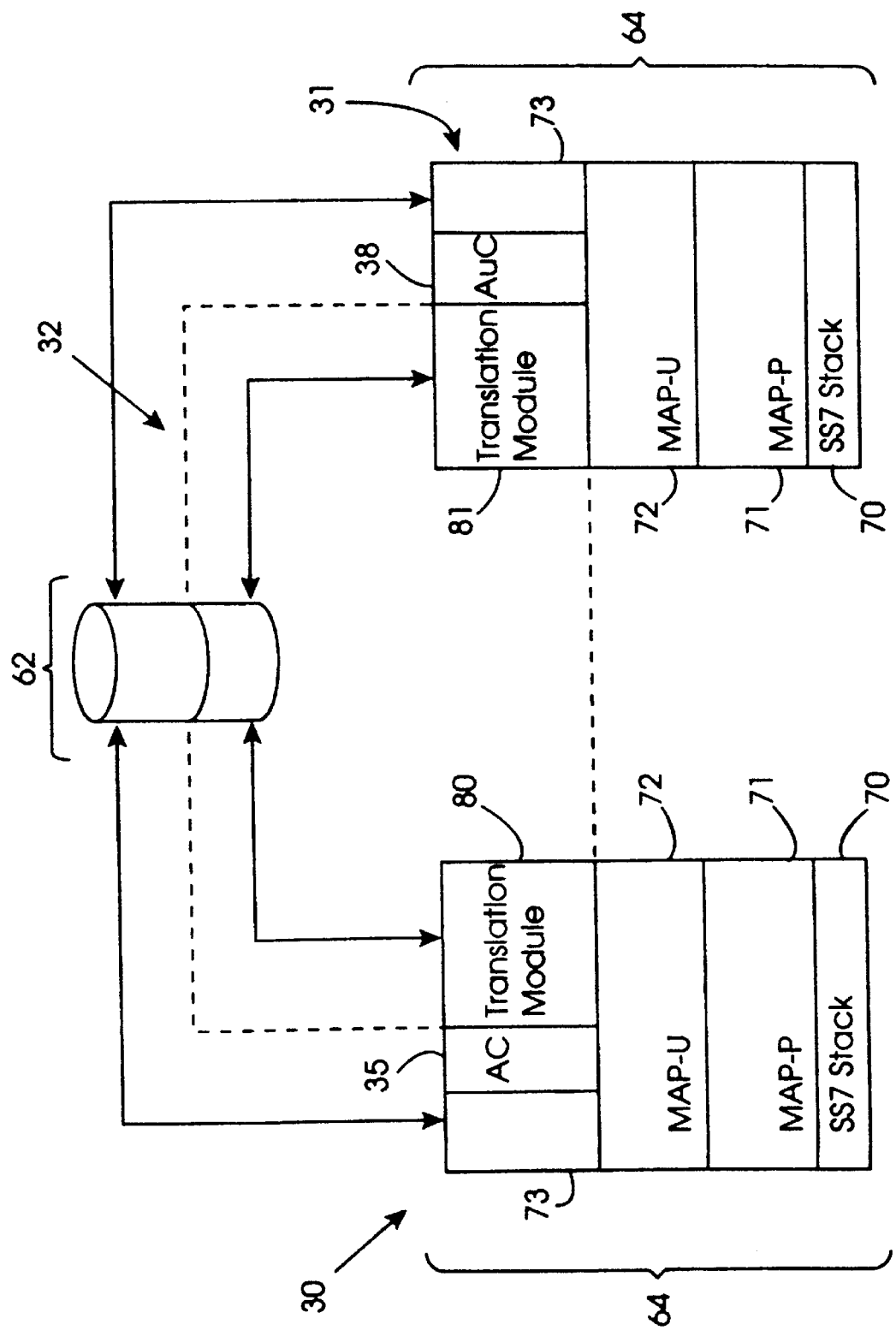

As is clear from the diagram of FIG. 5(c), the MAP-User 72 has access to the database servers 62. Each NAP 64 is associated with one modular unit.

The translation function 32 is shown by interrupted lines. It comprises translation modules 80 and 81 residing on the same NAPs as the modular units 30 and 31 respectively. These modules have access to databases residing on the database servers 62, as illustrated.

Alternative configurations could be used instead. For example, two modular units may reside on a single NAP 64, operating functionally as if they were on separate machines. Also, the AC and AuC could be on separate machines connected to the high speed network.

Referring now to FIGS. 6 to 9, the manner in which signals are handled by a RIG of the invention is illustrated.

To take the example of a GSM subscriber roaming in an IS.41 system, the following sets out the signals which are handled. To set up the RIG, the MIN, ESN, IMSI, authorisation period, and authorisation value data items are inputted to the RIG via the OMP machine 63. Referring in particular to FIG. 6, the signalling transfer when the GSM roamer initially registers in the IS.41 domain is illustrated. The RIG determines that the subscriber has first roamed as the location data is empty. Upon operating his or her mobile unit in the IS.41 domain, the IS.41 VLR transmits a registration notification signal 100 (REGNOT) to the RIG. The RIG then stores the subscriber location data, and transmits a signal 101 to the GSM HLR indicating the location update. The GSM HLR then transmits a signal 102 containing the subscriber profile data. The RIG then stores this data and acknowledges receipt with a signal 103. The GSM HLR then indicates with a signal 104 that it has terminated the signalling. The RIG then indicates with a signal 105 to the IS.41 VLR that the profile has been updated. This data is stored by the RIG in the database associated with the translation function 32 shown in FIG. 4. This data is very important as it allows transfer of important data to provide supplementary services such as call forwarding in a transparent manner.

Figure 7:
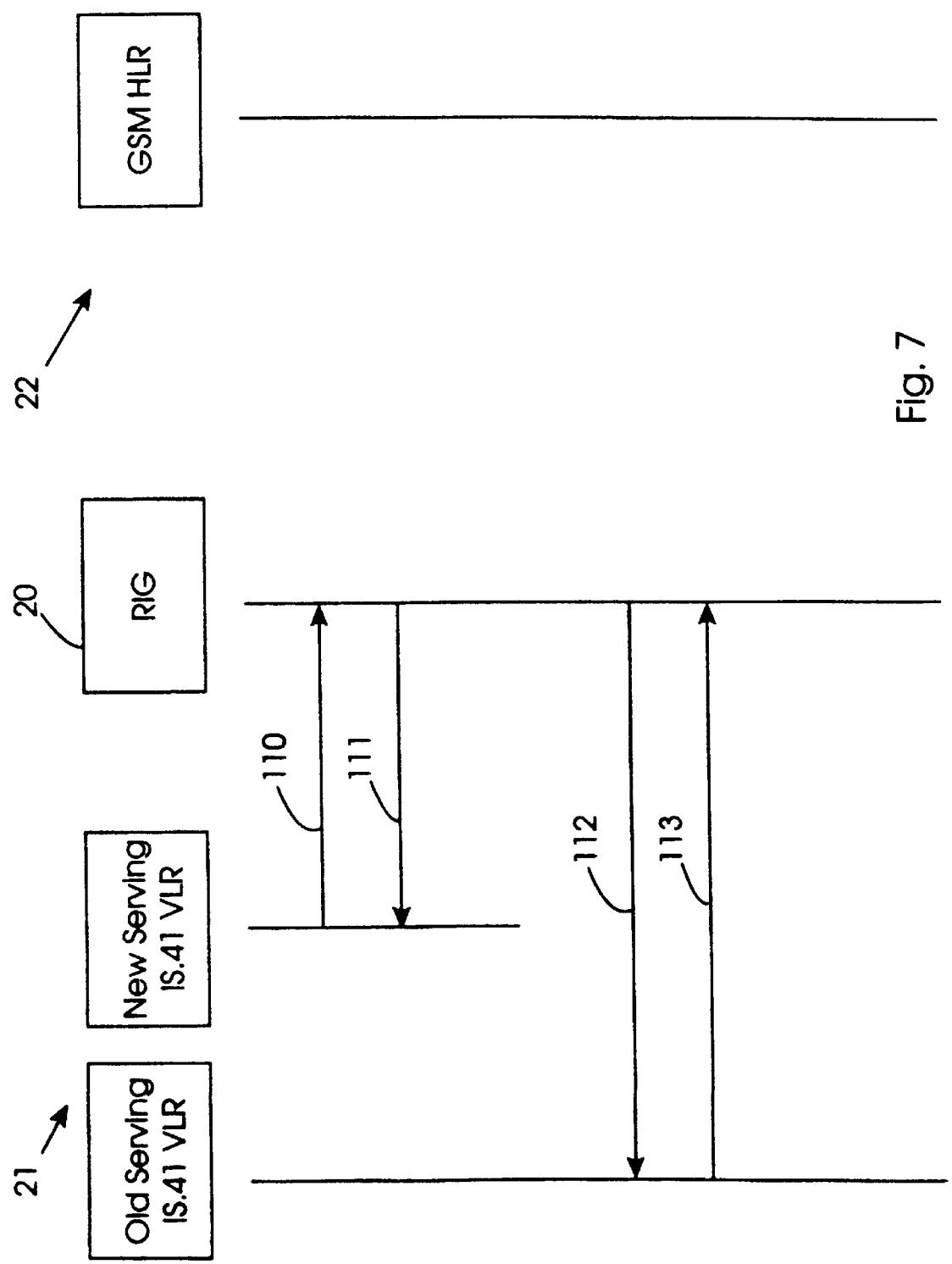

Referring in particular to FIG. 7, the signalling sequence when the GSM subscriber continues to roam in the IS.41 system is illustrated. Because the RIG has already stored the subscriber profile there is no need for any signalling in the GSM system. The RIG downloads the stored subscriber profile to the new serving VLR with a signal 111 in response to a notification 110. A registration cancellation signal 112 is then transmitted to the old serving IS.41 VLR, this being acknowledged by a signal 113.

Figure 8:
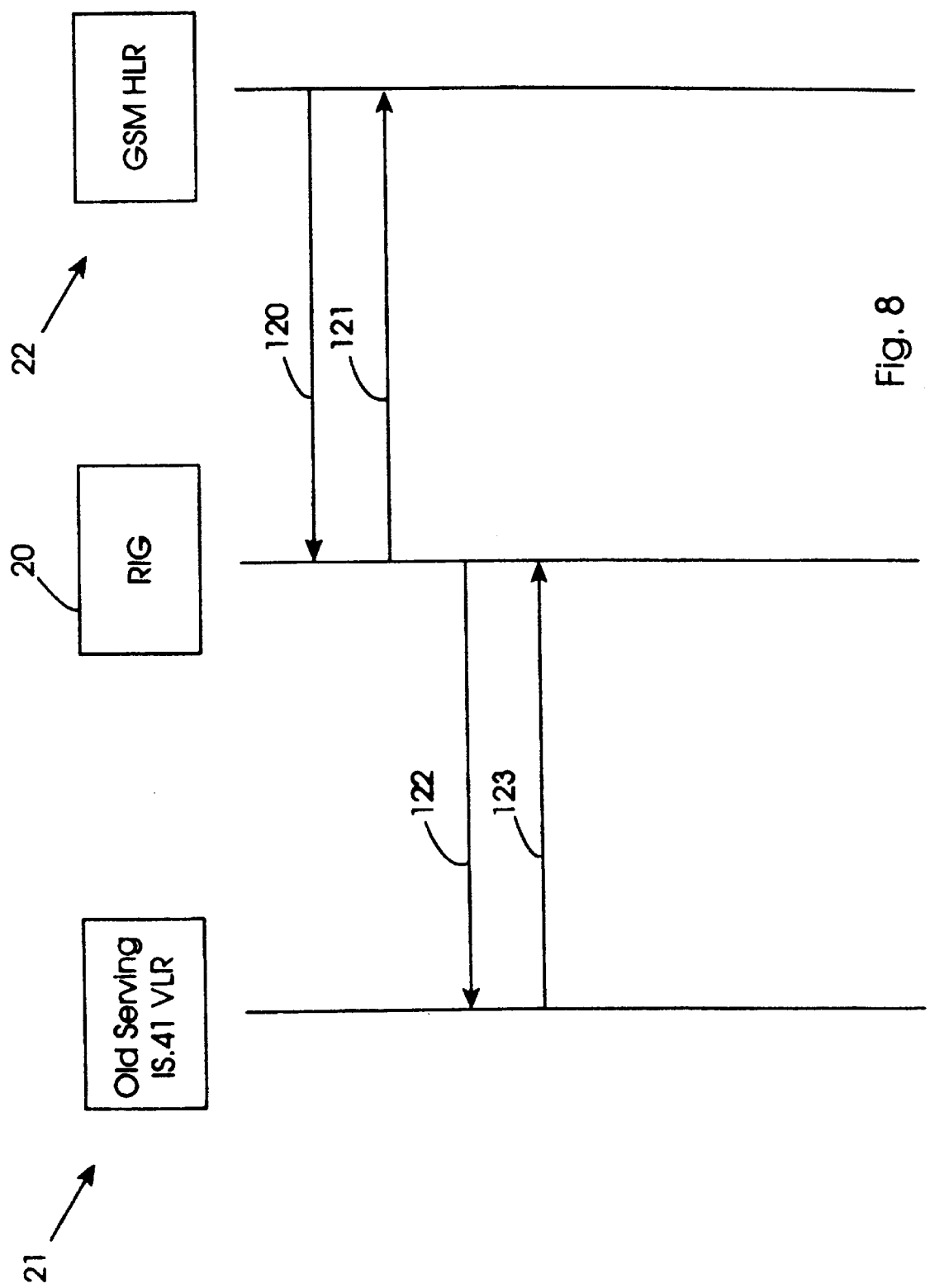

Referring now to FIG. 8, the signalling sequence for return of the GSM subscriber to the GSM networks is illustrated. The RIG receives a cancellation signal 120 and acknowledges it with a signal 121. To perform the cancel function, the RIG removes all transient data for the subscriber and sends an IS.41 registration cancellation signal 122 to the last IS.41 VLR in which the subscriber was roaming. This is acknowledged by a signal 123.

Referring now to FIG. 9, the signalling diagram for a successful mobile terminating call to a GSM subscriber roaming in a IS.41 territory is shown. The RIG inserts its own location data as the IS.41 originating MSC. This is used later when the RIG performs the function of a dummy IS.41 MSC for forwarding the call. All mobile terminating calls for the roaming GSM subscriber are routed to the RIG via the GSM HLR. For this reason, restrictions to mobile terminating calls will be implemented by the subscriber's GSM HLR and need not be duplicated in the RIG. The GSM HLR provides the roaming number with a signal 130 and the RIG transmits a route request signal 131 to the serving IS.41 VLR. The serving IS.41 VLR 132 returns a TLDN signal 132 to the RIG. If this is in a national format, a table mapping country codes to VLRs is necessary. A look-up is then performed to this table to find the country code of the VLR. This is then added to the TLDN to form the international E.164 MSRN returned to the GSM HLR in a signal 133.

The signals 130 and 133 correspond to the part of the signal 23 of FIG. 2 on the right side of the RIG 20, and the signals 131 and 132 to that part of the signal 23 on the left side of the RIG 20.

The manner in which signals are routed through the RIG is shown in more detail in FIG. 4 as a set of signals (i) to (vi). The signal (i) is transmitted through the RIG for registration of a GSM subscriber in the IS.41 system, and the signal (ii) for registration of an IS.41 subscriber roaming in the GSM system. The signal (iii) is transmitted for setting up a call to a GSM roamer in the IS.41 system. As is clear from FIG. 4, this signal is routed through the pseudo GSM MSC/VLR, the translation function 32, and the pseudo IS.41 HLR and then onto the IS.41 signalling system. The opposite happens for a call to an IS.41 subscriber roaming in the GSM system and this is indicated by the signal (iv).

As is clear from this diagram, the interworking signals pass through the translation function. This involves translation operations such as:

Data conversion, e.g. changing an IS.41 MIN to a GSM IMSI,

Code or protocol conversion, including all signalling formats. An example is conversion of a GSM Provide Roaming Number request to an IS.41 Route Request.

Also shown in this diagram are the handling of signals for authentication. For example, the signal (v) is routed through the AuC 38 and the GSM HLR 40 for an authentication request by an IS.41 subscriber roaming in the GSM system. The signal (vi) is transmitted through the AC 35 when an IS.41 VLR is authorising a GSM subscriber roaming in its territory. As is clear from the diagram, the AuC 38 interacts with the GSM HLR 40 for authentication.

Another function of the translation function 32 is billing conversion. A billing conversion component is a modular software module which forms the necessary protocol conversion between billing centres in the different non-compatible mobile systems. The billing converter performs error checking on billing files and billing records and raises an alarm if any error is found. The billing convertor is configured to continue processing remaining billing records in the file, or to discard the complete file. Another function is conversion of telephone numbers such as MIN to IMSI. This function is implemented as a software module on the OMP machine.

It will be appreciated that the invention provides a simple and modular construction of RIG. This allows easy upgrading, maintenance and modification. For example, a RIG may be easily upgraded for interworking with a third system by simply adding a second translation function and a third modular unit associated with the third system. Additional supplementary services are easily added by connection of modules on top of the MAP-Interface of the relevant modular unit. An example of the flexibility which is allowed is that if a subscriber in a GSM domain only wants to register as a roamer in an IS.41 domain, this can be achieved by registration only in the IS.41 HLR 37 of the modular unit 30. In this case, registration signals when the subscriber is roaming in the IS.41 domain terminate at the IS.41 HLR 37, which is effectively the real HLR for the subscriber. This situation may arise for example if a European subscriber only wants to use a digital cellular unit when visiting the USA - either using no cellular unit or an analog unit at home.

The fact that the RIG comprises pseudo network elements means that it can be very easily installed using conventional initialisation for real network elements such as HLRs, MSCs etc. Also, production of a RIG has a considerably reduced design lead time because its design is based on components such as a MAP-Interface which are standard for systems.

The invention is not limited to the embodiments hereinbefore described, but may be varied within the scope of the claims in construction and detail.

What is claimed is:

1. A roaming interworking gateway for interworking of at least two mobile telecommunication systems having non-compatible standards, the gateway comprising:
    a modular unit associated with a first mobile system and comprising a pseudo network element for the first system;
    a modular unit associated with a second mobile system and comprising a pseudo network element for the second system; and
    an interworking translation function linking the modular units and comprising means for performing data and protocol conversion between the units, wherein
    each said modular unit of said first and second mobile system comprises a MAP interface comprising
        a signalling stack,
        a MAP-provider residing on the signalling stack, and
        a MAP-user residing on the MAP-provider and comprising means for accessing a database,
    the interworking translation function includes
        a database comprising means for receiving and storing a subscriber identifier for each mobile system,
        a translation module residing on the MAP-user of each said modular unit of said first and second mobile system, and comprising means for accessing said database, each said translation module comprising
        means for registering a roaming subscriber upon receipt of a registration notification signal comprising the steps of automatically transmitting a location update signal to the home system, receiving a subscriber profile from the home system, and storing the received subscriber profile in the database, and
        means for handling subsequent notifications from a registered subscriber with reference to the stored subscriber profile.

2. A gateway as claimed in claim 1, wherein each modular unit comprises at least two pseudo network elements at different hierarchal mobile system levels.

3. A gateway as claimed in claim 2, wherein each modular unit comprises a pseudo HLR, and a pseudo MSC or VLR or both an MSC and a VLR.

4. A gateway as claimed in claim 3, wherein each pseudo HLR comprises means for routing signalling set-up signals for a terminating call to a visited system, the MSC or VLR comprising means for receiving such signals from a home system.

5. A gateway as claimed in claim 1, wherein each modular unit comprises an authentication function comprising means for authenticating roamers in the associated mobile system domain.

6. A gateway as claimed in claim 1, wherein each modular unit resides on a network access processor.

7. A gateway as claimed in claim 6, wherein the translation function comprises at least two translation modules residing on one or more network access processors.

8. A gateway as claimed in claim 6, wherein the gateway comprises a high speed network linking hardware machines in a distributed manner.

9. A gateway as claimed in claim 8, further comprising an operations and maintenance processor connected to the network.

10. A gateway as claimed in claim 1, further comprising a billing conversion function.

11. A gateway as claimed in claim 10, wherein the billing conversion function resides on an operations and maintenance processor of the gateway.

12. A roaming interworking gateway for interworking of at least two mobile telecommunication systems having non-compatible standards, the gateway comprising:
    a modular unit associated with a first mobile system and comprising a pseudo network element for the first system,
    a modular unit associated with a second mobile system and comprising a pseudo network element for the second system, and
    an interworking translation function linking the modular units and comprising means for performing data and protocol conversion between the units, wherein
    each modular unit comprises a MAP interface comprising
        a signalling stack,
        a MAP provider residing on the signalling stack, and
        a MAP-user residing on the MAP-provider and comprising means for accessing a database,
    the interworking translation function comprises
        a database comprising means for receiving and storing a subscriber identifier for each mobile system,
        a translation module residing on the MAP-user of each modular unit and comprising means for accessing said database, each translation module comprising
        means for registering a roaming subscriber upon receipt of a registration notification signal comprising the steps of
            automatically transmitting a location update signal to the home system,
            receiving a subscriber profile from the home system, and storing the received subscriber profile in the database,
        means for handling subsequent notifications from a registered subscriber with reference to the stored subscriber profile, and wherein
    each modular unit further comprises an authentication module residing on the MAP-user;
    the database stores a table mapping country codes and each translation module comprises means for accessing said table for routing number conversion; and
    each translation module comprises means for performing telephone number conversion.

* * * * *